Patented Dec. 22, 1931

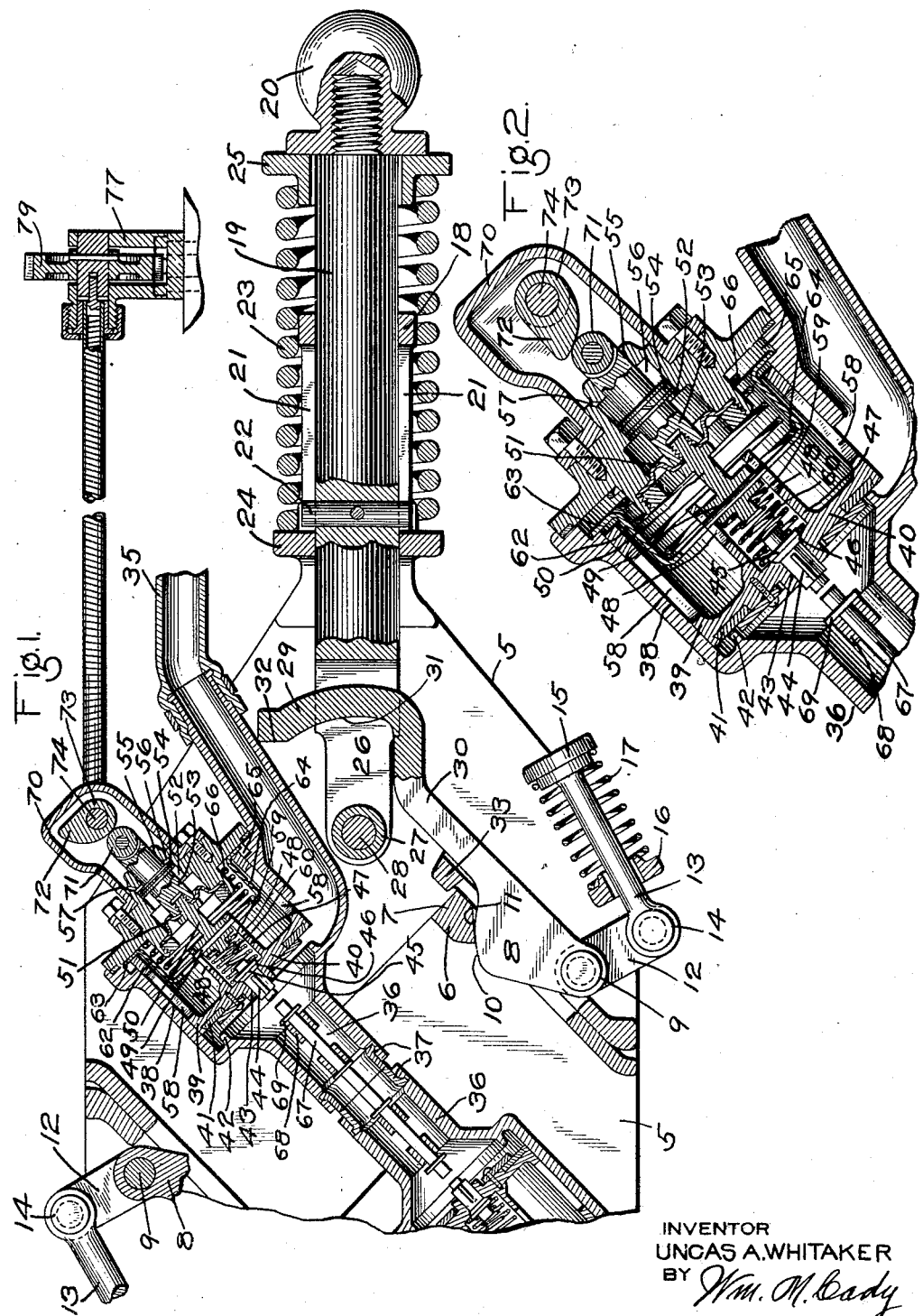

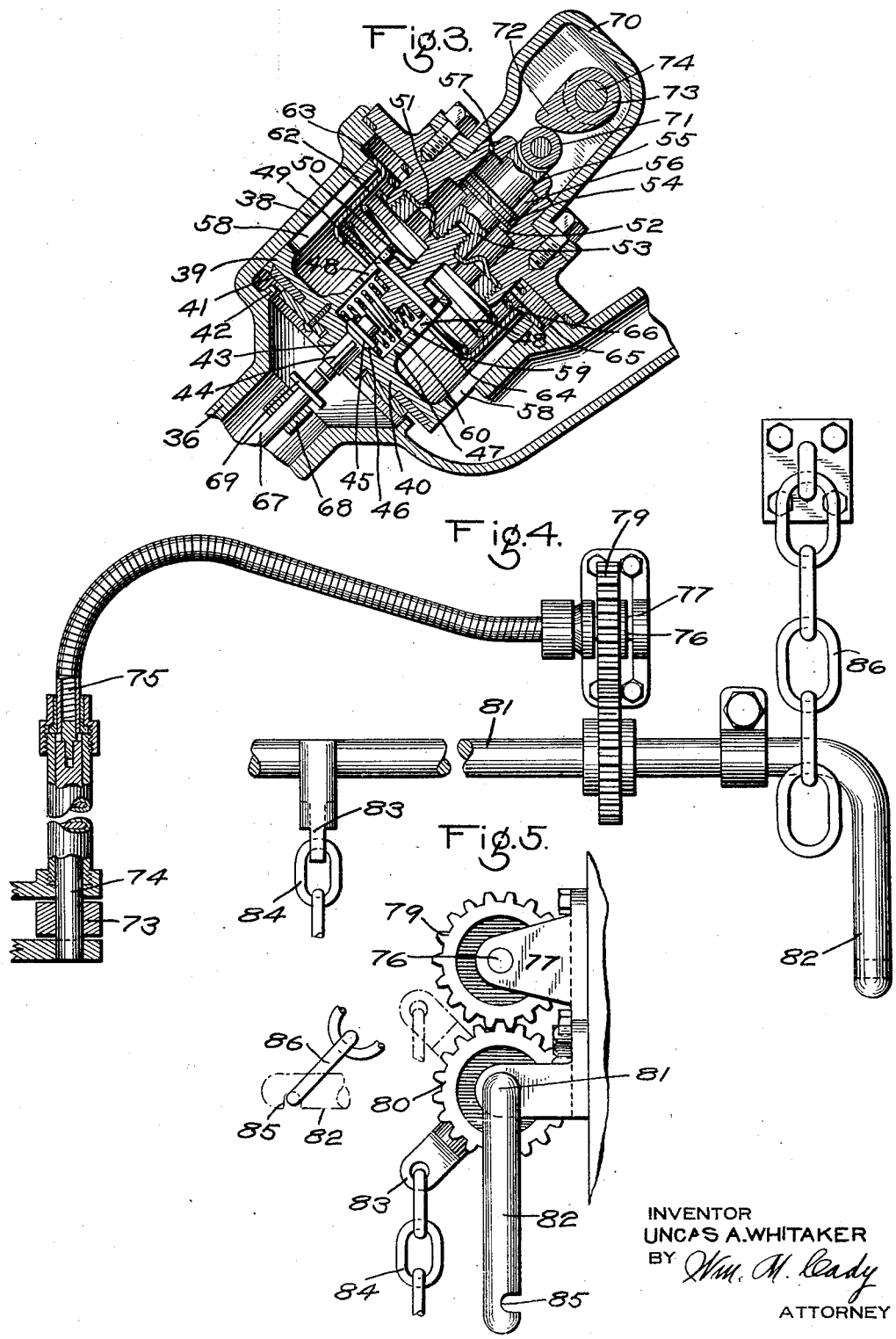

1,837,349

UNITED STATES PATENT OFFICE

UNCAS A. WHITAKER, OF WILMERDING, PENNSYLVANIA, ASSIGNOR TO THE WESTING-HOUSE AIR BRAKE COMPANY, OF WILMERDING, PENNSYLVANIA, A CORPORATION OF PENNSYLVANIA

FLUID CONTROLLED MEANS FOR AUTOMATIC TRAIN PIPE COUPLINGS

Application filed December 14, 1928. Serial No. 326,091.

This invention relates to automatic train pipe couplings, and more particularly to the type known as the tight or rigid lock coupling.

An object of the invention is to provide novel fluid control means for automatic train pipe couplings.

Another object of the invention is to provide an automatic train pipe coupling having fluid control means by which communication through a conduit in the coupling will be prevented when the cars are intentionally separated, and in which the fluid control means will not be actuated to shut off the communication through the conduit should the cars be unintentionally separated.

Another object of the invention is to provide a train pipe coupling having fluid control means which are operated upon the coming together of counterpart couplings for permitting flow of fluid under pressure at a restricted rate, the fluid control means being operated upon a predetermined increase in pressure of fluid flowing through the coupling for permitting flow of fluid at an increased rate and upon a further increase in fluid pressure for permitting flow of fluid at a still greater rate.

Another object of the invention is to provide a train pipe coupling in which the communication through a conduit in the coupling is controlled by means of a poppet valve adapted to be manually actuated to shut off the communication through the conduit when the cars are uncoupled and to be automatically unseated by means mounted in the conduit and operated upon the coming together of the coupling with a counterpart coupling when the cars are being coupled up.

Another object of the invention is to provide a train pipe coupling in which communication through a conduit in the coupling will be automatically restricted when a section of train having a charged brake pipe is coupled to a section having an uncharged brake pipe, means being included for automatically permitting unrestricted communication through the brake pipe when the pressure of the fluid in the two train sections is so nearly the same amount that an emergency application of the brakes will not result.

Another object of the invention is to provide an automatic train pipe coupling of the type specified, wherein communication through a conduit in the coupling is controlled by means of a valve device adapted to be actuated in such a manner as to restrict the fluid flowing through the conduit in varying amounts when a section of train having a charged brake pipe is coupled to a section having an uncharged brake pipe.

Another object of the invention is to provide an automatic train pipe coupling of the character specified, in which communication through a conduit in the coupling is controlled by means of a compound poppet valve comprising a main valve adapted to form a restricted opening through the conduit and an auxiliary valve carried by the main valve and adapted to control communication through a restricted opening in the main valve.

Another object of the invention is to provide an improved type of train pipe coupling of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a longitudinal section of an automatic train pipe coupling embodying the invention showing the same in coupled position;

Fig. 2 is an enlarged section of the valve device in closed position; Fig. 3 is a view of the structure shown in Fig. 2, the valve being partially opened; Fig. 4 is a view of the car coupling unlatching mechanism and the means actuated thereby for operating the valve device; and Fig. 5 is an end view of a portion of the structure shown in Fig. 4.

Train pipe couplings of the type known as the tight or rigid lock coupling are shown, for example, in Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge a section of train having empty train pipes from a section having charged train pipes.

By the present invention, means are provided for actuating the valve device of an automatic train pipe coupling when the car unlatching mechanism is operated, so as to close the valve when the car is uncoupled, the valve actuating mechanism being operated automatically to open the valve when the coupling is coupled to a counterpart coupling, and being prevented from operating to close the valve should the cars be unintentionally uncoupled. Means are also provided for permitting only a restricted amount of fluid to flow from the charged brake pipe of a train section into an uncharged brake pipe when a charged section of train is coupled to an uncharged section, until the pressure of the fluid has been built up a predetermined amount in the uncharged brake pipe, whereupon the restriction is reduced slightly so as to increase the flow of the fluid from the charged brake pipe to the uncharged brake pipe, so that an emergency application of the brakes on the charged section will not be caused by a too rapid drop in the brake pipe pressure.

Referring to the drawings, the automatic train pipe coupling head 5 comprises a projecting nose 6 adapted to engage in a recess 7 of a counterpart coupling head.

A lever 8, pivoted in the coupling head 5 at 9, has a cam face 10 for engaging the face 11 of a counterpart coupling head, to lock the two coupling heads together when the same are coupled in the manner shown in Fig. 1.

The lever 8 carries an arm 12, to which a rod 13 is pivotally connected by a pin 14. The outer end of the rod 13 is provided with a head 15, and interposed between said head and a fixed abutment 16, is a coil spring 17.

The rear end of the coupling head 11 is formed with a tubular extension 18 which constitutes a guide for the forward end of the stem 19.

The stem 19 has its rear end provided with a ball section 20 adapted to be mounted in a socket (not shown) carried by the car.

The tubular extension 18 is provided with diametrically disposed longitudinal slots 21 into which extend the projecting ends of a pin 22 which is passed transversely through the stem 19.

A coil spring 23 encircles the stem 19 and the tubular extension 18, one end of the spring bearing against a flange 24 formed on the inner end of the coupling head, while the opposite end of the spring bears against a collar 25 at the inner end of the stem.

The spring 23 is normally under initial compression, which tends to hold the parts extended. However, when the coupling head is coupled to a counterpart coupling, the spring is compressed, and the forward end of the stem 19 is disposed in the coupling head in the manner shown in Fig. 1, for a purpose to be described.

At the front end, the stem 19 is provided with an extended portion 26, on which a roller 27 is mounted by means of a pin 28. The roller 27 is disposed along the longitudinal center line of the stem and it is adapted to be engaged by the hook-shaped end 29 of an arm 30 extending from the lever 8.

When the coupling head is coupled with a counterpart coupling, the spring 17 will force the cam surface 10 of the lever 8 tightly into engagement with the surface 11 of the counterpart coupling, and the end 29 of the arm 30 will be disengaged from the roller 27. However, when the cars are uncoupled and the couplings separate, the spring 27 will force the coupling head outwardly on the stem 19, thereby bringing the cam surface 31 on the end 29 of the arm 30 into contact with the roller 27.

The extremity of the arm 30 is formed with an arcuate recess 32 into which the roller 27 seats when the coupling head 5 is moved outwardly with respect to the stem when the coupling is being uncoupled. In this way the lever 8 will be retained in its innermost position within the coupling head and it will be disposed out of the path of the nose 6 of a counterpart coupling head.

For the purpose of limiting the outward movement of the lever 8, the coupling head is provided with a lug 33 against which the arm 30 may strike in case the interlock provided when the roller 27 is positioned in the recess 32 should become detached when the coupling head is uncoupled.

The coupling head is provided with one or more conduits. In the present instance it is shown as having a conduit 36, the rear end of which is connected to the brake pipe 35.

The forward or nose end of the conduit 36 is provided with a gasket 37 adapted to abut the corresponding gasket on the other coupling and make a fluid tight joint between the conduits when the coupling heads are coupled together.

For the purpose of controlling communication through the conduit 36, a compound poppet valve device is mounted in a chamber 38 formed in the coupling head 5 and communicating with conduit 36.

The compound poppet valve device includes a valve piston 39 having a head 40 provided with a gasket 41 for engaging with a seat rib 42 when the coupling head is uncoupled, so as to cut off communication through the open end of the conduit 36.

Within the gasket 41, the head of the valve piston is pierced to provide an opening 43 for the fluted stem 44 of an auxiliary valve 45. The head of this valve is adapted to engage a seat 46 formed around the opening 43, and surrounding the head of the valve 45 is a tubular collar 47 which is carried by the head 40 of the valve piston 39.

The side wall of the collar 47 is formed with diametrically disposed slots 48, into which extend the projecting ends of a pin 49 carried by a stem 50 projecting from one side of a diaphragm 51.

The side of the diaphragm 51 opposite to the side having the stem 50 carries a plunger 53 to which is fixed a piston 54 which is slidably mounted in a chamber 52.

The plunger 53 is passed through an opening 55 formed in the end wall of the valve casing, and the chamber 56 on the side of the piston 54 opposite to the chamber 52 is vented to the atmosphere through an opening 57, also formed in the end wall of the valve casing.

On one side, the diaphragm 51 is subject to the pressure of fluid which is admitted to chamber 38 through a plurality of openings 58 formed in the skirt of the valve piston 39, while from the other side, the diaphragm is adapted to be forced downwardly when the plunger 53 is depressed through mechanism to be hereinafter described.

Contained within the collar 47 is a pair of expansible coil springs 59 and 60, the former bearing at one end against the head 40 of the valve piston 39, while the latter spring, which is disposed within the spring 59, bears at one end against the head of the valve 45. At their opposite ends, both springs bear against the end of the stem 50 and thus tend to retain the valve piston 39 extended relative to the diaphragm 51, the outward movement of the valve piston relative to the diaphragm being limited when the pin 49 engages the ends of the slots 48, as shown in Fig. 1.

Mounted within the chamber 38 and enclosed by the skirt of the valve piston 39, is a cage 62, having an outturned flange 63 at one end, and an inturned flange 64 at its opposite end. As shown, the cage 62 has a diameter slightly less than the diameter of the skirt of the valve piston 39, so that the cage will be free to move relative to the valve piston. On the other hand, the periphery of the flange 63 extends beyond the exterior of the skirt of the valve piston so as to be engaged by the edge of the skirt in the manner shown in Fig. 1.

The periphery of the flange 63 is disposed within an annular groove 65 formed in the end of the chamber 38. The opposed side walls of the groove 65 are spaced apart a suitable distance so as to permit of limited longitudinal movement of the cage within the chamber 38 and relative to the valve piston, as will be hereinafter more fully described.

Contained within the cage 62 is an expansible coil spring 66, one end of which bears against the flange 64 while the opposite end thereof bears against the end wall of the chamber 38.

The extremity of the plunger 53 is provided with a roller 71 against which rides the face of a cam 72 of an actuator 73 mounted on a shaft 74 journalled in a coupling head.

The portion of the plunger 53 protruding beyond the opening 55 and the actuator 73 are preferably enclosed in a casing 70 which protects this portion of the valve mechanism so as to keep the same from becoming inoperative due to clogging by snow, ice or dirt. The casing 70 also prevents any possibility of the plunger 53 becoming wedged down from any cause.

The shaft 74 is operated by a flexible drive shaft 75, one end of which is connected to the end of the shaft 74, while the opposite end thereof is connected to the end of a shaft 76 journalled in a bracket 77 mounted on the end of the car.

The shaft 76 is preferably disposed at a point contiguous to the mechanism used for releasing the car coupling locking pin in the car coupler, and this shaft carries a gear 79 which meshes with a gear 80 on the rod 81 of the said mechanism.

At one end, the rod 81 is bent downwardly to provide a lever 82, while intermediate of the rod, there is a laterally projecting arm 83, to the extremity of which a chain or other flexible element 84 is attached for lifting the car coupling pin (not shown) when the lever 82 is actuated, as will be hereinafter described.

Near its extremity, the lever 82 is provided with a notch or groove 85 for receiving a link of a chain or other flexible element 86 suspended from the car, when the lever is in a raised position, so as to lock the lever to prevent rotation of the gears 79 and 80, drive shaft 75, and actuator 73, when the car is uncoupled.

Within the forward portion of the conduit 36 there is an elongated plunger 67 which is slidably mounted in spaced bearings 68. The opposite ends of the plunger beyond the bearings are provided with collars 69. These collars are spaced apart a distance greater than the distance between the bearings 68 so as to permit limited longitudinal movement of the plunger. For this purpose the relative positions of the collars with respect to the bearings should be such that when the coupling head is uncoupled, one end of the plunger will project beyond the gasket 37 an amount sufficient to be engaged by the end of a similar plunger projecting from the conduit 36 on a counterpart coupling, and be removed thereby inwardly of the conduit.

In operation, when the cars are intentionally uncoupled, the car coupler at the end of the train section which it is desired the brake pipe should remain charged is manipulated by swinging the lever 82 from the full line position shown in Fig. 5 to the broken line position shown. The lever 82 is locked in position by slipping a link of the chain 86 over its end and into engagement with the notch 85.

The upward movement of the lever 82 will be transmitted through the gears 80 and 79 to the shaft 75, and the cam 72 will be rotated in a direction to depress the plunger 53, which will in turn move the diaphragm 51 downwardly.

The downward movement of the diaphragm 51 will be transmitted through springs 59 and 60 respectively to the head of the valve piston 39 and the head of valve 45. The valve device will now be forced toward the seat rib 42, thereby shutting off communication through the conduit 36.

When the valve piston 39 moves toward the seat rib 42, the cage 62 will be moved from the position shown in Fig. 1 to that shown in Fig. 2 by the force exerted by spring 66.

After the valve piston has been seated against the seat rib 42, continued movement of the diaphragm 51 will telescope the stem 50 and the collar 47 together, the pin 49 of the stem 50 moving down the slots 48 in the collar 47 so that the valve piston will be held firmly seated by the force exerted by the spring 59 plus the pressure of the fluid in chamber 38 which is admitted thereto through the openings 58 in the skirt of the valve piston 39.

After the car coupling pin has been lifted by swinging the lever 72 upwardly in the manner heretofore described, and as the cars separate, the interlocked train pipe coupling heads 5 will remain coupled and locked together until the cars have moved apart sufficiently to pull the coupling heads outwardly of the stems 19 until further longitudinal movement is prevented by the pins 22 engaging the ends of the slots 21.

This action will move the end 29 of the arm 30 toward the extremity of the portion 26 of the stem 19. When the cam surface 31 engages the roller 27, the arm 30 will be caused to move laterally of the stem until the roller 27 engages in the recess 32. The cam surface 10 of the lever 8 will now be withdrawn from the face 11 of the counterpart coupling head. In this way the interlocked coupling heads will be automatically unlatched.

On the other hand, in coupling a section of train having an uncharged brake pipe to a section having a charged brake pipe, when the cars are brought together for coupling up, the impact of the two coupling heads coming together will move the coupling head 5 rearwardly on the stem 19, and this action will detach the roller 27 from its engagement with the recess 32 of the arm 30.

When the projecting nose 6 of one train pipe coupling head enters the recess 7 of the counterpart coupling head, the gaskets 37 of the conduits 36 will meet and the two conduits will be connected together.

The pressure of spring 17 will force the lever 8 outwardly toward the nose 6 of the counterpart coupling head so that the cam face 10 engages the face 11 and locks the two coupling heads tightly together in the manner shown in Fig. 1.

When the coupling heads 5 come together for coupling up, the projecting ends of the plungers 67 will also be brought together and each plunger will be moved inwardly of the conduit 36 and abut the end of the valve stem 44, thereby forcing the valve 45 inwardly away from its seat 46.

The valve 45 of the two coupling heads will thus be unseated when the gaskets 37 meet and the adjoining ends of the conduits 36 are connected, thereby establishing communication between the section of train having the charged brake pipe and the section having the uncharged brake pipe.

In view of the restricted passage which the opening 43 in each of the valve pistons 39 provides, the rate at which the fluid flows from the charged brake pipe when the valve pistons 39 are seated against the seat ribs 42 will be restrained an amount sufficient to prevent a rapid drop in the pressure in the charged brake pipe. Therefore, an emergency application of the brakes on the section of train having the charged brake pipe which would be caused by a rapid drop of the pressure of the brake pipe fluid, will not result.

The section of train having the uncharged brake pipe will thus be supplied with fluid from the charged brake pipe at a reduced rate, so that pressure is gradually built up in the uncharged brake pipe.

When the cars are being coupled together, the lever 82 is released from the link of the chain 86 to which it is fastened, and then swung downwardly from the position shown by the broken lines in Fig. 5 to the full line or vertical position therein shown. This movement of the lever returns the cam 72 to the position shown in Fig. 1, and the pressure of the fluid in chamber 38 acts on the diaphragm 51 to force the same upwardly.

During this upward movement of the diaphragm 51, the pin 49 will be moved longitudinally of the slots 48 until further movement of the stem 50 outwardly from the collar 47 is prevented by the pin engaging the ends of the slots. Continued movement of the diaphragm 51 will lift the valve piston 39 from the seat rib 42 and move the same outwardly from the seat rib 42 until the edge of the skirt of the valve piston 39 abuts the flange 63 of the cage 62. The pressure exerted by the spring 66 against the flange 64 of the cage will maintain the cage in its inward position, as shown in Fig. 3, and therefore a restricted opening between the head of the valve piston 39 and the seat rib 42 will be provided through which the fluid flows from the charged brake pipe to the uncharged brake pipe, an amount slightly greater than that permitted through the opening 43.

The valve piston 39 will be retained in this intermediate position until the pressure has been built up a predetermined amount in the conduits 36, whereupon this increase of pressure against the head 40 of the valve piston will overbalance the pressure of spring 66, and move the valve piston further away from the seat rib 42. The cage 62 will thus be carried by the skirt of the valve piston to the position shown in Fig. 1, and in this way unrestricted communication through the brake pipe will be had.

If the cars unintentionally separate, the actuator 73 will not be operated to depress the diaphragm 51, and consequently the valve piston 39 will remain in the unseated position shown in Fig. 1. This is possible, because no restriction is provided from the brake pipe 35, outside of seat rib 42 and the conduit 36. Therefore, the pressure over the entire lower face of the valve piston 39 will reduce at the same time. Openings 58 are of such flow area as to allow pressure from chamber 38 to reduce with the pressure on the lower face of the valve piston 39. The pressure on the valve piston thus remains equal and the pressure on the diaphragm 51 is therefore permitted to hold said valve piston in the fully opened position, thereby permitting an unrestricted flow of the brake pipe fluid through the open end of the brake pipe when the coupling heads are pulled apart. In this way an emergency application of the brakes will be effected.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A coupling having a conduit formed with a chamber, a valve mounted in the chamber, an auxiliary valve mounted in said first-named valve, means mounted in the conduit for actuating the auxiliary valve to permit a restricted amount of fluid to flow through the conduit when the first-named valve is seated, means for subsequently unseating the first-named valve after a predetermined amount of fluid has passed by the auxiliary valve, and means for limiting the outward movement of the first-named valve to permit a restricted amount of fluid to pass through the conduit until a predetermined pressure has been built up on the seat side of the first-named valve.

2. A coupling having a conduit, a compound valve device for controlling communication through the conduit, said valve device including a main valve and an auxiliary valve mounted in the main valve for normally closing a restricted opening therein, means mounted in the conduit and actuated upon the coming together of the coupling with a counterpart coupling for unseating the auxiliary valve when the main valve is seated, means for unseating the main valve when a predetermined amount of fluid has passed through the restricted opening therein, and means for limiting the outward movement of the main valve beyond a predetermined distance until a predetermined amount of fluid has passed through the conduit.

3. The combination with a coupling having a conduit, of a valve device for controlling communication through the conduit, comprising a main valve and an auxiliary valve mounted in the main valve, means for actuating the auxiliary valve to permit a restricted amount of fluid to flow through the conduit when the main valve is seated, means for subsequently unseating the main valve, and means for limiting the outward movement of the main valve so that a restricted amount of fluid of increasing volume is permitted to flow through the conduit for a predetermined period.

4. The combination with a coupling having a conduit, of a valve device for controlling communication through the conduit comprising a main valve and an auxiliary valve mounted in the main valve, and means for successively operating the auxiliary valve and the main valve when the coupling is being coupled with a counterpart coupling whereby a restricted amount of fluid of increasing volume is permitted to flow through the conduit.

5. The combination with a coupling having a conduit, of a valve device for controlling communication through the conduit comprising a main valve and an auxiliary valve mounted in the main valve, means for actuating the auxiliary valve so as to permit a restricted amount of fluid to flow through the conduit when the main valve is seated, means for subsequently actuating the main valve, and means for temporarily limiting the opening movement of the main valve so as to permit a restricted amount of fluid of gradually increasing volume to flow through the conduit for a predetermined time.

6. The combination with a coupling having a conduit, of a valve device for controlling communication through the conduit comprising a main valve and an auxiliary valve mounted in the main valve, means for successively operating the valves when the coupling is being coupled with a counterpart coupling whereby the auxiliary valve is first operated to permit a restricted amount of fluid to flow through the conduit when the main valve is seated and the main valve is operated after a predetermined amount of fluid has passed by the auxiliary valve, and means for controlling the operation of the main valve whereby the volume of fluid flowing through the conduit is gradually increased.

7. The combination with a coupling having a conduit, of a valve device for controlling communication through the conduit comprising a main valve and an auxiliary valve mounted in the main valve, means for actuating the auxiliary valve to permit a restricted amount of fluid to flow through the conduit, means for subsequently actuating the main valve, and means for limiting the movement of the main valve so as to permit a larger but restricted amount of fluid to flow through the conduit for a predetermined time.

8. A coupling having a conduit, a valve device for controlling communication through the conduit comprising a main valve and an auxiliary valve mounted in the main valve, means for actuating the auxiliary valve to permit a restricted amount of fluid to flow through the conduit when the main valve is seated, means for unseating the main valve after a predetermined amount of fluid has passed by the auxiliary valve, and means for limiting the outward movement of the main valve so that a restricted amount of fluid of increasing volume is permitted to flow through the conduit.

9. The combination with a coupling having a conduit, of a valve device for controlling communication through the conduit comprising a main valve and a pilot valve mounted in the main valve, said pilot valve being operated upon the coming together of counterpart couplings for permitting flow of fluid under pressure at a restricted rate, and said main valve being operated upon a predetermined increase in pressure of fluid flowing through the conduit for permitting flow of fluid at an increased rate and upon a further increase in fluid pressure for permitting flow of fluid at a still greater rate.

In testimony whereof I have hereunto set my hand, this 8th day of December, 1928.

UNCAS A. WHITAKER.